Feb. 26, 1963

O. G. OSWOLD 3,079,188

DEMOUNTABLE COUPLING

Filed Feb. 23, 1961

INVENTOR.
OLUF G. OSWOLD
BY Frank C. Parker
ATTORNEY

United States Patent Office

3,079,188
Patented Feb. 26, 1963

3,079,188
DEMOUNTABLE COUPLING
Oluf G. Oswold, Canadice, N.Y., assignor to Bausch & Lomb Incorporated, Rochester, N.Y., a corporation of New York
Filed Feb. 23, 1961, Ser. No. 91,195
3 Claims. (Cl. 287—119)

The present invention relates to a quick demountable coupling and more particularly relates to improvements in the locking mechanism therefor.

It is an object of this invention to provide improvements in quick demountable couplings regarding simplicity and low cost of contsruction, ease of assembly and reliability of alignment of the operating parts thereof.

A further object is to provide a coupling having such a locking structure that the force required for separation of the demountable parts is considerably greater than the force needed to couple the same, said parts being easily coupled together from initially misaligned positions, and the coupling elements being contained within an integral enclosure for protection against entrance of foreign matter.

Figure 1:
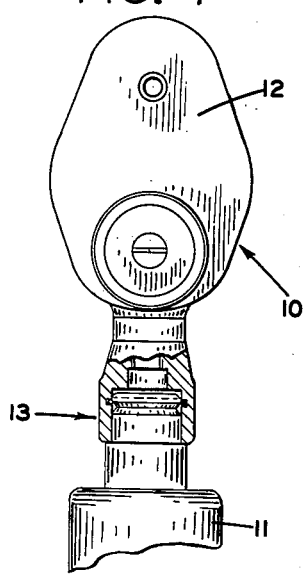
Figure 2:
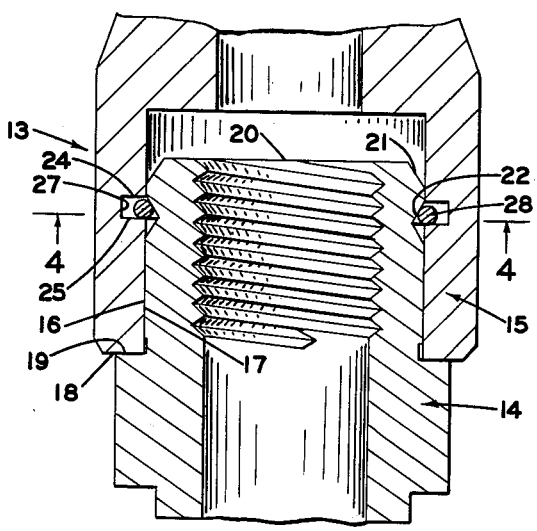
Figure 3:
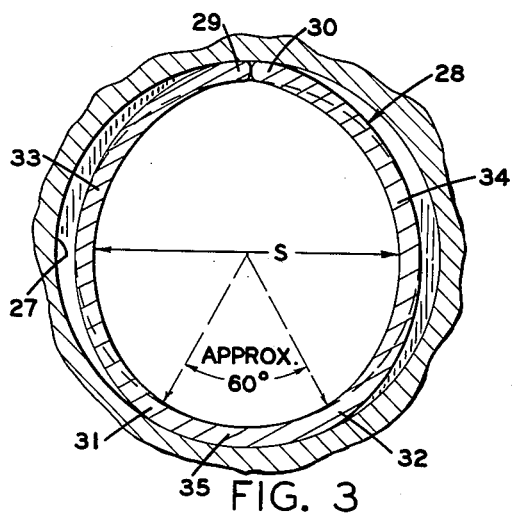
Figure 4:
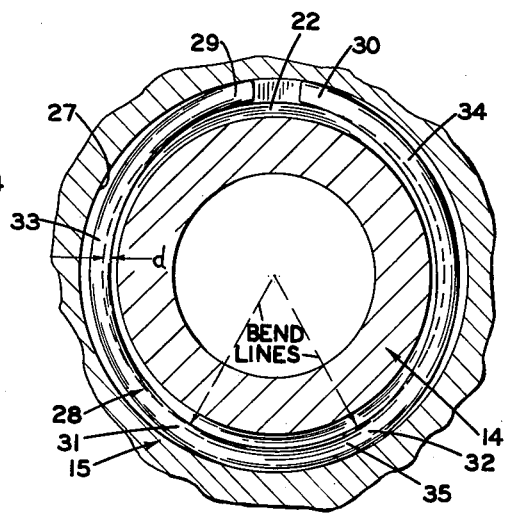
Figure 5:
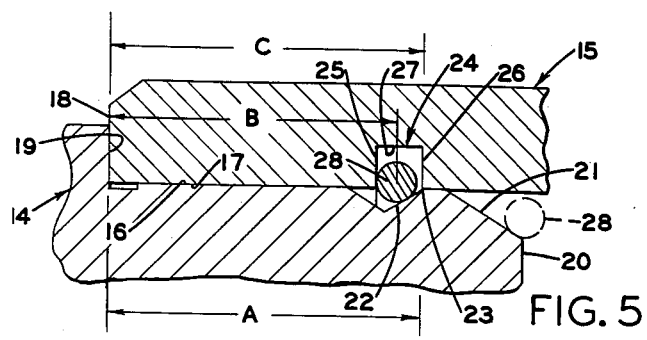

Further objects and advantages will be found in the details of construction and arrangement of parts by reference to the specification herebelow taken together with the accompanying drawing wherein:

FIG. 1 is a side elevational view of one form of the present invention used in connection with an instrument, FIG. 2 is an enlarged midsectional view partly broken away of a preferred form of the invention, FIG. 3 is an enlarged sectional view of certain locking parts of the coupling shown in idle or demounted position, FIG. 4 is an enlarged sectional view taken on the line 4—4 of FIG. 2, and FIG. 5 is an enlarged sectional detail fragmentarily shown of certain locking parts of the coupling.

One of the advantageous uses of the present invention is illustrated in FIG. 1 of this drawing which shows an opthalmic instrument, generally indicated by the numeral 10, having a handle 11 which is demountably connected to an instrument head 12 by a separable coupling mechanism 13.

According to this invention, said coupling mechanism comprises two telescoping parts which are a base part 14 and a demountable part 15, said parts having formed thereon the companion cylindrical bearing surfaces 16 and 17 respectively which are slidably fitted together as shown in FIG. 2. For the purpose of obtaining a well supported and aligned coupling when assembled, the bearing surfaces 16 and 17 are preferably made as long as practical conditions permit. Two radial shoulders 18 and 19 are formed at the rear ends of the bearing surfaces 16 and 17 respectively which serve as abutments for locating the longitudinal assembled position of part 15 on part 14.

The front end 20 of the inner member 14 has a large bevel 21 formed thereon to facilitate the initial assembly when demountable part 15 is misaligned so that it is not necessary to try to get good alignment of the parts before assembling. Near the front end 20 of part 14 is formed an inclined locking surface 22 preferably at an angle of about 30° to the bearing surface 17 for a purpose to be explained hereinafter, the leading edge 23 of which should be located forwardly of said shoulder 19 a distance of at least substantially 70% of the distance between the front end 20 and the shoulder 19 to further facilitate assembly and disassembly of said coupling parts.

Formed in superimposed position over said locking surface 22 in part 15 is a recess 24 having a rear radial wall 25, a front radial wall 26 which is parallel thereto and a bottom wall 27. The front wall 26 is substantially coplanar with the leading edge 23 of the locking surface 22.

One of the novel features of this invention is the locking ring 28 which is provided for holding the demountable part 15 on the other part 14. Said ring 28 is peculiarly shaped to promite easy assembly of parts 14 and 15 but nevertheless assure a great resistance to disassembly.

The locking spring ring 28 is formed of spring wire in an ovate shape and having two free ends 29 and 30 located in mutual abutment at the small end of the oval when said ring is relaxed. The diameter D of the spring wire is smaller by a quantity of at least .2D than either the width or the depth of said recess 24 so that the wire may be moved freely and be entirely housed therein when required.

Opposite said ends 29 and 30 of lock ring 28, two slight bends 31 and 32 are formed having an angular separation therebetween of about 60° or 1 radian. Extending between said bends 31 and 32 and the respective ends 29 and 30, are two opposite arcuate spring portions 33 and 34 as shown best in FIG. 3 formed with an outer radius at least as large as the radius of the bottom 27 of said recess 24. A portion 35 between said bends 31 and 32 of the wire ring 28 has an outer diameter approximately equal to the radius of the bottom 27 of the recess 24 so that the portion 35 and the ends 29 and 30 are seated within the recess for transverse location therein of the ring.

The aforesaid spring portions 33 and 34 are effectively the active parts of the locking mechanism and are designed to be wedged by spring force betwene radial recess wall 25 and the inclined locking surface 22, the wedging action causing the shoulder 18 to be forced against the shoulder 19 as best shown in FIG. 5 to lock the coupling in assembled position. Before the ring 28 is so assembled it is in a prestressed condition in recess 24, and the maximum size of the span S between the opposite inner surfaces of said spring portions 33 and 34 as shown in FIG. 3 should be no larger than the diameter of the bearing surface 18 minus twice the diameter of the spring wire whereby a satisfactory locking force may be obtained when said portions are deflected.

FIG. 4 shows how the spring portions 33 and 34 appear when distended by and when resting on the inclined surface 22. In this condition the spring ends 29 and 30 are separated and the spring portions 33 and 34 are constricted from their maximum distended position slightly by an amount "d" which is approximately equal to .2D where D is the diameter of the wire. This last fact is an important feature since the actual spring stress in said portions 33 and 34 during the locking function is maintained close to the maximum stress encountered during the assembly operation.

A further advantageous feature is found in the "wrapping-down" action of the spring portions 33 and 34 when these portions are deflected by the locking surface 22 so that the line of contact therebetween is considerably lengthened and the total friction which opposes demounting of said coupling is thereby increased. This fact taken together with the aforesaid increase in spring stress in the locking portions 33 and 34 both contribute additively to produce a frictional effect which requires a much greater force for demounting than for mounting the coupling when the lock ring 28 lies on the inclined surface 22.

In assembling the coupling 13, the outer part 15 may be set onto the inner part 14 at any convenient angle and swung into alignment with the complementary part while applying longitudinal pressure. The lock ring 28 is thereupon pushed up the bevel 21 by the recess wall 26 which carries the ring over the bearing surface 17 and onto the inclined lock surface 22 just as the abutment surfaces 18 and 19 come into contact to limit the motion.

It will be understood from the foregoing description that:

(a) The lock ring is provided with two active spring portions 33 and 34 which act as locking elements and these elements are assembled in prestressed condition in their accommodating recess 24 so that a maximum effective locking force may be produced with a minimum of change of deflection of the spring elements.

(b) The deflection of said spring elements 33 and 34 increases during coupling of the separable parts, said spring elements actually wrap down around the inclined surface 22 somewhat so that the increased length of the line contact of these elements on surface 22 when fully assembled is much greater than the frictional contact of said ring on the bevel 21 during the early part of the assembly operation. This effect combined with the fact that the lock wire rests on a backward incline when the parts are completely coupled results in the necessity of a much larger force for uncoupling than for the coupling operation.

Although only a preferred form of this invention has been shown and described in detail, other forms are possible and changes may be made in the details of shape and arrangement of the parts thereof without departing from the spirit of the invention as defined in the claims appended herebelow.

I claim:

1. In a quick demountable coupling comprising two telescoping parts having interfitted bearing surfaces formed thereon, means for establishing engaged position of said parts, a rearwardly facing inclined annular locking surface intersecting the innermost of said surfaces, a pair of spaced radial walls defining an annular recess which is formed in the outermost of said bearing surfaces so as to overlie said inclined surface, and a discontinuous ovate shaped lock ring for operatively connecting said parts, said ring being held in said recess and being formed from spring wire having a diameter which is substantially less than the depth of the recess, the improvement in said ring comprising two opposite arcuate resilient portions formed thereon which forcibly bear against said inclined locking surface when the coupling is assembled, the outside radius of said arcuate portions being greater than the radius of the bottom of said recess, a third arcuate portion interconnecting said two arcuate portions and extending about one radian along the bottom of said recess between two bend lines which mark a change of ring curvature adjacent to the two arcuate portions, the developed length of the ring being such that the free ends thereof are forcibly held by spring stress in contact with each other and in contact with the bottom wall of the recess when said third arcuate portion is seated under said spring stress against said bottom wall in which condition the aforesaid two arcuate portions are maintained prestressed by outward flexure of the arcuate portions when assembled in the recess.

2. A quick demountable coupling according to claim 1 wherein the depth and width of said recess is substantially 1.2D when D represent the diameter of said wire and wherein said locking surface is so inclined and situated with reference to said rearmost wall of the recess that said opposite resilient portions of the ring are wedged therebetween in a radial position substantially .2D less than the fully expanded position thereof so that the spring stress which is applied while said portions are in locking position is close to the highest stress induced during assembly and the line of contact of the ring on said inclined surface is thereby increased in length to increase the frictional resistance to separation of the coupling, the cumulative effect of the high spring stress and the increased length of the line of friction causing the force required for demounting the coupling to be much greater than the force required for coupling.

3. A quick demountable coupling as set forth in claim 1 further characterized by the portion of the ring between said bend lines having a nominal outer radius not larger than the radius of the bottom of said recess, and the two opposite resilient portions when disengaged from said inclined locking surface having a maximum separation therebetween of less than the diameter of said bearing surfaces but not less than the diameter of said bearing surfaces minus 2D where D represents the diameter of the spring material from which the ring is made.

References Cited in the file of this patent

UNITED STATES PATENTS

| | | |
|---|---|---|
| 684,664 | Anderson | Oct. 15, 1901 |
| 738,503 | Waters | Sept. 8, 1903 |
| 798,865 | Bailey | Sept. 5, 1905 |
| 858,131 | Aichele | June 25, 1907 |
| 1,202,372 | Foner | Oct. 24, 1916 |
| 1,630,367 | Woodbridge | May 31, 1927 |
| 1,652,140 | Elwell | Dec. 6, 1927 |
| 2,253,018 | Cowles | Aug. 19, 1941 |